Figures 1, 2:
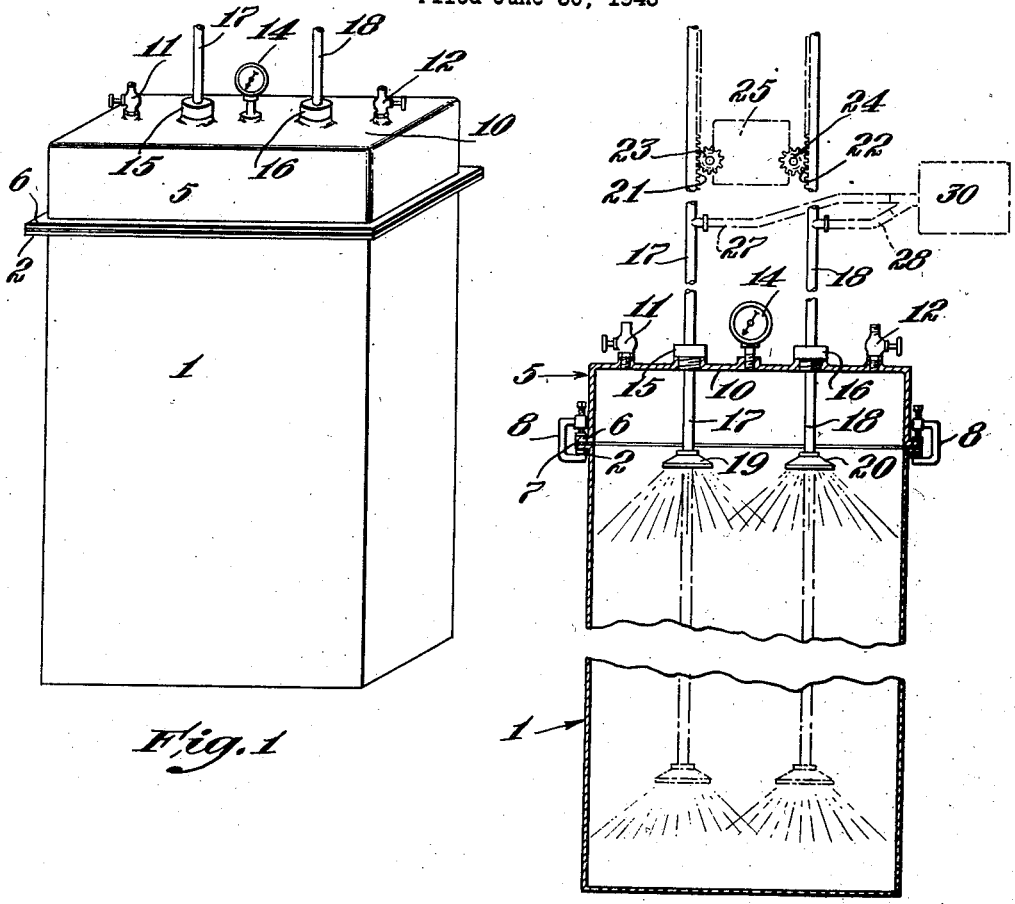

Oct. 30, 1945.  J. R. MacDONALD  2,387,921
MANUFACTURE OF ICE
Filed June 30, 1943

Inventor
Joseph R. Macdonald
by Pobub, Cushman & Woodbury
Att'ys.

Patented Oct. 30, 1945

2,387,921

UNITED STATES PATENT OFFICE 2,387,921

MANUFACTURE OF ICE

Joseph R. MacDonald, Winchester, Mass.

Application June 30, 1943, Serial No. 492,798

3 Claims. (Cl. 62—172)

This invention relates to the manufacture of ice and its principal objects are to provide an efficient method and apparatus which greatly reduces the time now required to effect thorough freezing and to provide a method of and apparatus for making an oxygenated white ice which is particularly suitable for use in packing various types of food products.

Further objects will be apparent from a consideration of the following description and the accompanying drawing, wherein:

Fig. 1 is a perspective view of a freezing tank having a removable head constructed in accordance with the present invention; and Fig. 2 is a longitudinal section through the tank and head shown in Fig. 1.

In accordance with the present invention a freezing tank, which may be of conventional construction, is immersed in refrigerated brine or other suitable refrigerating medium maintained at a subfreezing temperature, for example a temperature of the order of 15° F., and preferably the air in the tank is evacuated and replaced by oxygen gas under a slight pressure, e. g. a pressure of the order of 1-5 lbs. gage. Thereafter water, which preferably has been previously cooled to a low temperature, is intermittently sprayed against the wall portions of the freezing tank, the spray passing through the oxygenated atmosphere within the freezing tank so as to absorb oxygen gas. Since the walls of the freezing tank are maintained at a relatively low temperature, the spray upon striking the bottom or ice layers accumulated thereon, quickly freezes, and as the operation is continued the layers become integrated into a solid cake of oxygenated ice. The intermittent spraying may be continued over a period of several hours, depending upon such factors as the size of the freezing tank, the temperature of the brine, the temperature of the water being sprayed, etc., until the integrated layers form a solid cake which substantially fills the freezing tank.

The quantity of water sprayed during each cycle and the time between cycles may vary over a wide range, depending upon the aforementioned factors, but in any case it is advisable, if not necessary, to limit the quantity of water sprayed during each cycle to an amount, the major portion of which will become frozen almost instantaneously upon contact with the bottom of the container or the previously formed ice layers thereon, and likewise the time between cycles should be sufficient for the major portion of the heat in the sprayed water to be absorbed or transferred through the tank into the brine or other refrigerant. As the layers of ice build up within the tank the rate of heat transfer or conductivity through the accumulated layers will gradually decrease and hence it may be advisable, if not necessary, to reduce the quantity of water injected during each cycle and/or increase the time between spraying cycles. In any case at least partial freezing should take place during and between spraying cycles and it will be found that the time required for complete freezing of a given quantity of water is substantially less than that required in accordance with conventional practices.

The particular embodiment herein shown for the purpose of illustration comprises a conventional freezing tank 1 which is of rectangular cross section, being approximately 1' x 2' and 4' deep, and having a flanged upper end 2. A head 5 of the same cross sectional size and shape is formed with a flange 6 at its lower end which seats squarely on the flange 2 of the tank, and a gasket 7 carried by the flange 6 provides a substantially air-tight seal. C-clamps 8 or other suitable means may be provided to hold the head S on the tank 1, as illustrated in Fig. 2.

The upper or top wall 10 of the head 5 is formed with threaded openings which receive valves 11 and 12, a pressure gauge 14 and bushings 15 and 16. The bushings slidably support conduits or supply pipes 17 and 18, it being understood that suitable packing glands are provided to insure a substantially pressureproof sliding fit. The lower ends of the pipes 17 and 18 terminate within the tank 1 and carry spray nozzles 19 and 20, the construction and arrangement of parts being such that water sprayed from the nozzles impinges upon the walls of the tank, as illustrated in Fig. 2. The upper ends of the pipes 17 and 18 are suitably coupled with racks 21 and 22 which mesh with gears 23 and 24 operated by any conventional mechanism 25 which may be subject to manual control so as to vary the position of the nozzles 19 and 20.

The pipes 17 and 18 are connected by flexible conduits 27 and 28 to a suitable water supply which includes an ejector 30 which may be of conventional design and construction and embodying an operating mechanism which may be the same as or similar to that of the well-known Diesel engine injector and which is operative intermittently to force predetermined quantities of liquid through the discharge pipes at a rate, pressure and at intervals which may be manually or automatically controlled. Since such injectors are well known, a further description and illustration is unnecessary.

In using this apparatus to manufacture ice in accordance with what is now considered the preferred practice, the head 5 is first clamped to the tank 1 and the air therein is then evacuated through the valve 11 and oxygen gas under pressure is then admitted through the valve 12. With both valves closed and the spray nozzles 19 and 20 adjusted to their lowermost position, as indicated by the dot and dash lines of Fig. 2, the tank 1 is then immersed in refrigerating brine. After the lapse of a minute or two, which is usually sufficient thoroughly to cool the walls of the tank, the injector 30 is started so as intermittently to atomize or spray precooled water against the lower portions of the tank 1 and the accumulated layers of ice formed thereon. The intermittent spraying operation is continued for a period of several hours during which time the mechanism 25 may be either periodically operated, or continuously operated at a slow speed, to elevate the spray nozzles so as to direct the spray against the middle and upper portions of the freezing tank, thereby building up a solid block or cake of white ice to a level slightly below that of the flange 2. When a cake of ice has been built up to the desired level the injector 30 is shut off and nozzles 19 and 20 are elevated to their uppermost position and the tank is allowed to remain in the refrigerated brine for a period sufficient to insure a thorough and uniform freezing of the ice cake, after which the ice may be removed in the customary manner. Thus, a solid cake of oxygenated white ice is produced in a fraction of the time required to produce the same product in accordance with prevailing practices.

While I have shown and described one desirable embodiment of the invention, it is to be understood that various changes and modifications may be made without departing from the spirit and scope of the invention as set forth in the appended claims.

I claim:

1. In an apparatus for making ice of the type including a freezing tank adapted to be immersed in a refrigerant, a removable head adapted to be tightly fitted to the open end of the freezing tank so as to provide a substantially gas-tight closure, said head having valve means for admitting and withdrawing a gaseous fluid from the interior of the freezing tank, a spray conduit slidably mounted in said head and constructed and arranged so that its end may be adjustably positioned within the interior of the freezing tank when the head is applied thereto, and a spray nozzle carried by the end of said conduit and arranged so that water sprayed therefrom impinges upon the bottom portion of the tank and layers of ice accumulating thereon.

2. The method of making ice containing absorbed and entrapped gas which comprises displacing the air from an enclosed container immersed in a refrigerant maintained at a subfreezing temperature with a gas desired to be absorbed and entrapped, directing a fine spray of water through a portion of said gas and against the interior portions of said container, thereby to form a coating of ice on the bottom portion, and continuing the spraying of water against the accumulated ice layers at such a rate that the major portion of the liquid spray impinging upon the accumulated ice layers freezes almost instantly upon contact, thereby to form a solid block of ice containing absorbed and entrapped gas.

3. The method of making ice containing absorbed and entrapped oxygen, which comprises displacing the air from an enclosed container immersed in a refrigerant maintained at a subfreezing temperature with oxygen gas, directing a fine spray of water through a portion of said gas and against the interior portion of said container, thereby to form a coating of ice on the bottom portion, and continuing the spraying of water against the accumulated ice layers at such a rate that a major portion of the liquid spray impinging upon the accumulated ice layers freezes almost instantly upon contact, thereby to form a solid block of ice containing absorbed and entrapped oxygen.

JOSEPH R. MacDONALD.